United States Patent [19]
Rivalland et al.

[11] 3,898,706
[45] Aug. 12, 1975

[54] METHOD OF FORMING A RECESS IN A FASTENING ELEMENT HEAD

[75] Inventors: Louis France Rivalland; Aubrey Richard McGarry, both of Westville, South Africa

[73] Assignee: Utility Products (Proprietary) Limited, Durban, South Africa

[22] Filed: Nov. 6, 1973

[21] Appl. No.: 413,295

[30] Foreign Application Priority Data
Nov. 21, 1972  South Africa.................. 72/8229

[52] U.S. Cl............................ 10/10 R; 10/7; 10/26
[51] Int. Cl........................... B23g 9/00; B21k 1/46
[58] Field of Search........... 10/2, 5, 7, 10 R, 24, 26, 10/27 R; 85/45

[56] References Cited
UNITED STATES PATENTS

| | | | |
|---|---|---|---|
| 162,642 | 4/1875 | Frearson | 10/7 |
| 1,125,272 | 8/1938 | Erdman | 10/7 |
| 2,258,326 | 10/1941 | Holt | 85/45 |
| 2,643,142 | 6/1953 | Stellin | 10/7 |
| 2,986,752 | 6/1961 | Lovisek | 10/7 |
| 3,166,769 | 1/1965 | Wieber | 10/7 |
| 3,471,878 | 10/1969 | Herpich | 10/7 |

*Primary Examiner*—C. W. Lanham
*Assistant Examiner*—E. M. Combs
*Attorney, Agent, or Firm*—Ladas, Parry, Von Gehr, Goldsmith & Deschamps

[57] ABSTRACT

A method of forming a centrally located axially outwardly directed cruciform recess comprising a plurality of intersecting flat-bottomed slots having their ends closed-off in the end face of a fastening element head. The method includes forming the head in blank so that it is substantially polygonal in end elevation, and then cold-forging the recess so that metal flow renders the head substantially circular in end elevation.

A fastening element including a shank and a head at one end of the shank. The head is substantially circular in end elevation and has an end face having a cold-forged centrally located outwardly directed cruciform recess therein. The recess comprises a plurality of intersecting flat-bottomed slots having their ends closed off.

6 Claims, 16 Drawing Figures

PATENTED AUG 12 1975  3,898,706

SHEET 2

METHOD OF FORMING A RECESS IN A FASTENING ELEMENT HEAD

This invention relates to a method of forming a fastening element including a shank, and at one end of the shank, a head which is substantially circular in outline in end elevation, the head having in its axially outwardly directed end face a centrally located, axially outwardly directed recess. The invention also relates to such fastening element.

As used, the term "fastening element" includes screw fastening elements such as screws or bolts, and also the blanks for screws and bolts, in which the shanks have not yet been threaded.

In a fastening element including a head having a slot engageable by a screw driver bit it is desirable, in order to get as good a purchase as possible on the head, to have the slots as long as possible relative to the diameter of the head. The slot should also be as deep as possible without weakening the head excessively, particularly when the head is countersunk.

According to the invention a method of forming a fastening element including a shank and, at one end of the shank, a head having in its axially outwardly directed end face a centrally located axially outwardly directed cruciform recess comprising a plurality of intersecting slots, includes the step of forming the head in blank so that it is at least in part substantially polygonal in end elevation.

By "forming the head in blank" is meant roughing out the head in rough form, before forming a recess therein. The head in blank is thus a rough head, which has no recess therein. The method may include the step of cold-forging a centrally located axially outwardly directed cruciform recess in the end face of the head, the recess being so sized and aligned with the head that the metal flow during the cold-forging step renders the head substantially circular in end elevation. Forming the head in blank may be such that it, as a whole, is substantially rectangular in end elevation, the cruciform recess having a pair of intersecting slots. Instead, forming the head in blank may be such that it has a central rectangular raised platform standing proud of the remainder of the head, the cruciform recess having a pair of intersecting slots. Preferably forming the head in blank is by cold-working and is such as to render the head at least in part substantially square in end elevation, the coldforging being by means of a die formation having a pair of slot-forming formations which are normal to each other, and the cold-forging step including aligning the slot-forming formations with the head so that they extend substantially along the diagonals of the square during the cold-forging step.

Further according to the invention a method of forming a centrally located axially outwardly directed cruciform recess comprising a plurality of intersecting slots which are substantially flat-bottomed and have their ends closed-off in the axially outwardly directed end face of the head of a fastening element including a shank and a head at one end of the shank which head is substantially circular in end elevation, comprises the step of cold-forging the recess.

The method may include the step of, before cold-forging the recess, pre-forming the head in blank so that it at least in part is substantially polygonal in end elevation, the cold-forging being by means of a cruciform die formation having a plurality of intersecting slot-forming formations, and the size and alignment of the slot-forming formations during the cold-forging step being such that metal flow during the cold-forging step renders the head substantially circular in end elevation. The pre-forming may be by cold-working, being such as to render the head at least in part substantially square in end elevation, the die formation having a pair of slot-forming formations which are substantially normal to each other and which are aligned with the head so that they extend substantially along the diagonals of the square during the cold-forging step. The cold-working of the pre-forming step may be by means of a rough punch having a concave die formation which is substantially circular in end elevation and which has at its bottom a centrally positioned axial passage which is substantially square in cross-section, in which passage there is located a kick-out pin having a cross-section which is substantially square. Instead, the cold-working of the pre-forming step may be by means of a rough punch having a concave die formation which is substantially square in end elevation and which has at its bottom a centrally positioned passage which is substantially circular in cross-section, in which their is located a kick-out pin having a cross-section which is substantially circular.

Still further according to the invention a fastening element includes a shank and a head at one end of the shank which head is substantially circular in end elevation and has an axially outwardly directed end face, the head having a cold-forged centrally located outwardly directed cruciform recess in its end face, the recess comprising a plurality of intersecting slots, each slot being substantially flat-bottomed and having its ends closed-off.

There may be a pair of slots normal to each other, the slots intersecting each other substantially at their midpoints. Instead, there may be a pair of slots, one of the angles defined between the slots being between about 75° and about 88°, the complementary angle between the slots being between about 105° and about 92° and the slots intersecting each other substantially at their midpoints.

The head may be countersunk, and the included angle of the countersunk part of the head may be between about 75° and about 110°.

The axially outwardly facing end face may be substantially flat, the slots being of substantially even depth along their lengths. Each slot may have a length which is at least about half the maximum diameter in end elevation of the head, and the length of each slot is preferably at least about two thirds of the maximum diameter of the head. The slots may have a maximum depth which is between about an eighth and about a quarter of the maximum diameter in end elevation of the head, and the slots may be of even width along their lengths, the width being between about an eighth and about a quarter of the maximum diameter in end elevation of the head.

The leading portions of the side walls of the slots in one circumferential direction may be substantially normal to the floors of the slots, the trailing portions of the walls, opposite said leading portions, in said circumferential direction being in the form of ramps sloping upwardly from the floors of the slots to the axially outwardly directed end face of the head.

The recess may be formed according to the method as hereinbefore described.

The invention will now be described, by way of example, with reference to the accompanying drawings, in which:-

Figure 1:
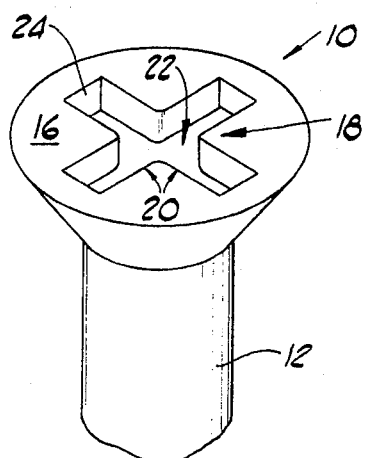
FIGS. 1 to 4 show three dimensional views of four different types of heads according to the invention for fastening elements.

In FIGS. 1 to 4 of the drawings, reference numeral 10 generally designates a head of a fastening element in accordance with the invention. Each head is shown at the end of a shank 12, (not shown in full). It will be appreciated that the fastening elements may be blanks as shown, the shanks 12 thus not being threaded. Instead, the fastening elements may be screw fastening elements in the form of nuts or bolts, with the shanks 12 threaded.

Figure 2:
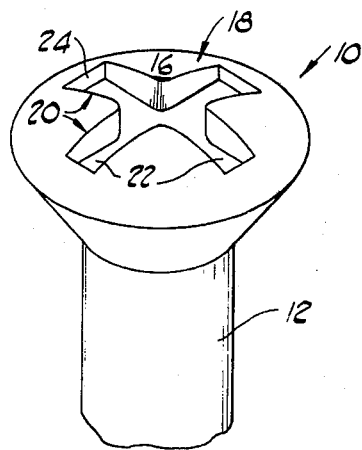
Figure 3:
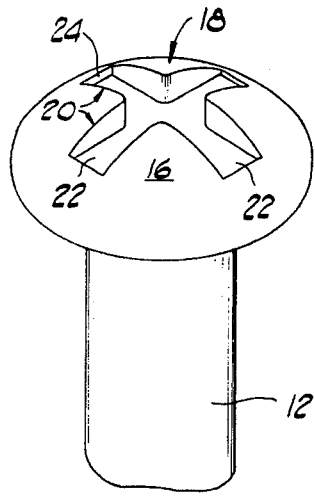
Figure 4:
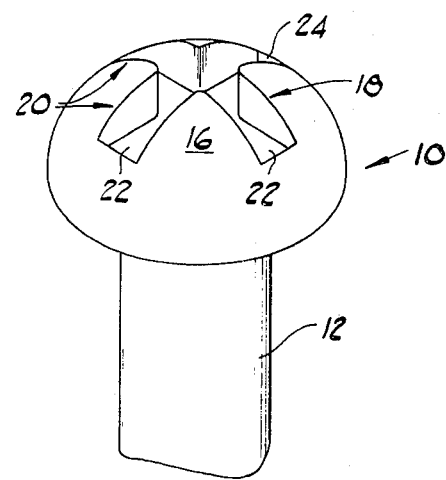
Figure 6:
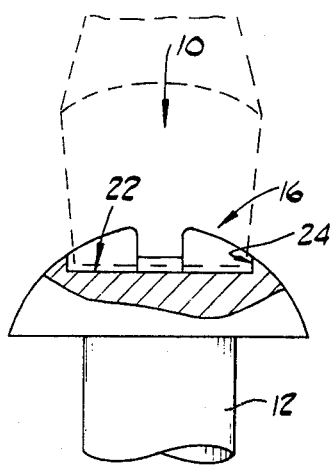
FIGS. 5 and 6 show diagrammatically, in sectional side elevation, the manner in which the bit of a chisel-ended screw driver fits into the recesses of the heads respectively of FIGS. 1 and 4.

In FIGS. 1 to 4, unless otherwise specified, like reference numerals refer to like parts. FIG. 1 shows a countersunk flat head; FIG. 2 shows a raised or rounded countersunk head; FIG. 3 shows a mushroom or truss-type head; and FIG. 4 shows a round or pan-type head. The heads 10 of FIGS. 1 and 2 have countersunk portions 10.1 and the included angle of said countersunk portions is a right angle. This included angle depends on the use for which the head is intended and can, for example, instead be 80°, 100°, etc., as desired. This is designated by 14 (broken lines in FIG. 5). Each head 10 has an axially outwardly directed end face 16, the head having a cold-forged centrally located outwardly directed cruciform recess 18 therein. Each recess 18 comprises a pair of intersecting slots 20. Each slot 20 is substantially flat-bottomed, having a floor 22 which is flat and substantially normal to the polar axis of the shank 12. Each slot has its opposite ends closed off by end walls 24.

In FIGS. 1 to 4, the slots 20 are shown normal to each other, the slots of each recess intersecting each other at their midpoints, and the point of intersection being at the centre of the face 16 of the head 10.

Figure 5:
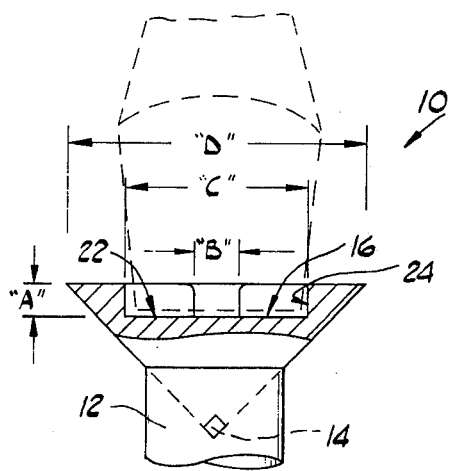

In FIGS. 1 to 4 the slots 20 of each recess 18 are identical. In each case the slot length is greater than half the maximum head diameter; in FIGS. 2 and 3 the slot length being about two-thirds of the maximum head diameter and in FIG. 1 the slot length being about six sevenths of the maximum head diameter. In each case the slot width and the maximum slot depth is between about an eighth and about a quarter of the maximum head diameter. In FIG. 5, for reference purposes, slot depth is designated by "A"; slot width is designated by "B"; slot length is designated by "C"; and maximum head diameter is designated by "D".

In FIG. 1, in which the end face 16 is flat, the slots 20 are shown of even depth along their lengths.

Figure 7:
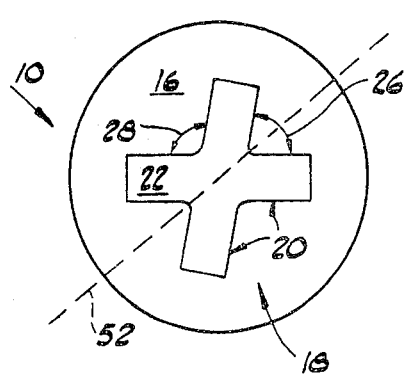
FIG. 7 shows a plan view of another type of head for fastening elements.

In FIGS. 5 to 9, unless otherwise specified, like reference numerals refer to like parts. In FIG. 7, the slots are not normal to each other; the angle 26 between the slots 20 being about 80° and the complementary angle 28 between said slots being about 100°.

Figure 8:
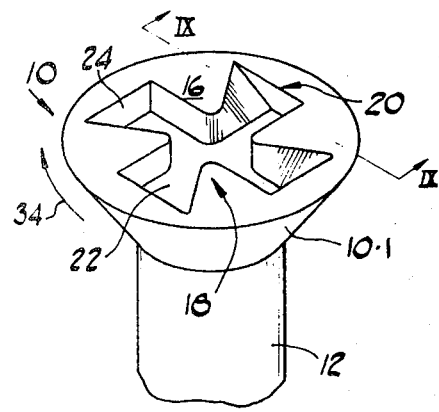
FIG. 8 shows a three dimensional view of yet another type of head for fastening elements.
Figure 9:
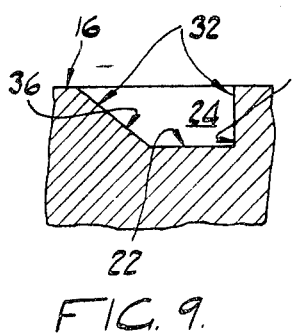
FIG. 9 shows a section along line IX—IX in FIG. 8.

In FIGS. 8 and 9 the leading portions 30 of the side walls 32 of the slots in the circumferential direction of arrow 34 are shown substantially normal to the floors 22 of the slots. The trailing portions 36 of said walls are shown in the form of ramps sloping upwardly from the floors 22 of the slots to the end face 16 of the head. Thus, if the head of FIGS. 8 and 9 is used on a screw or bolt having a shank with a right-hand thread, untightening the screw or bolt with a chisel-ended screw driver will be extremely difficult, and the screw or bolt will be substantially tamper-proof when tightened hard into position.

In FIGS. 1 to 9, the slots are shown identical for every recess 18. It will be appreciated that the slots need not be identical. Thus the width, depth and length of one slot may be different from that of the other slot. This increases the likelihood that a user of the fastening element will have a screw driver with a bit that fits closely into the slots; giving the screw element increased convenience in use. The user will thus be able to choose a screw driver having a bit which closely fits one of the slots. Furthermore, although each recess 18 comprises a pair of slots 20, the term "cruciform" is not to be construed in the specification as limited to a pair of slots. Thus, the heads 10 may have three or more intersecting slots, without departing from the invention.

Figure 10:
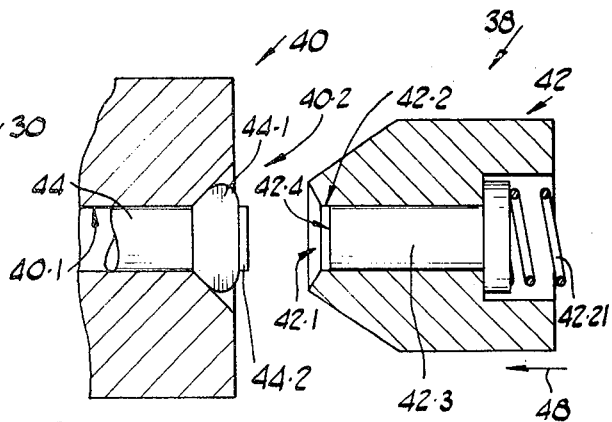
FIG. 10 shows a sectional side elevation of a die and rough punch assembly for use in the method according to the invention.

In FIG. 10 reference numeral 38 generally designates a die and rough punch assembly for use in accordance with the method of the invention. The assembly 38 comprises a die 40 and a rough punch 42. The die 40 is of metal and is shown provided with a passage 40.1 having a countersunk mouth 40.2. A length of metal wire 44 is shown located in position in the passage 40.1. The rough punch 42 is shown having a concave die formation 42.1. The die formation 42.1 is circular in end elevation and at the bottom of the die formation 42.1 there is a centrally positioned axial passage 42.2 which is substantially square in end elevation. The passage 42.2 is centrally located in the die formation 42.1 and is provided with a kick-out pin 42.3 which is substantially square in cross-section and is located in the passage 42.2 by coil spring 42.21 under compression. The wire length 44 is shown after a head 44.1 has been formed on it in blank by a rough-punching operation of the rough punch 42, the outline of the head being convex and corresponding to the concave die formation of the rough punch, and the head having a centrally positioned raised platform 44.2 corresponding in shape to the cross-sectional outline of the passage 42.2. The end of the kick-out pin 42.3 is recessed at 42.4 from the end of the passage 42.2 at the die formation 42.1, to act as a guide for the wire length 44 during the rough punching step.

Figure 11:
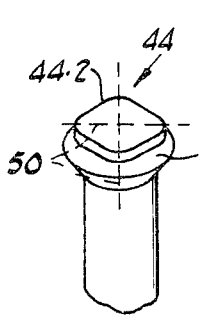
FIG. 11 shows a three dimensional view of a head for fastening elements, in blank, according to the invention.

In FIG. 11, reference numeral 44 generally designates the head in blank formed from the length of wire shown in FIG. 10, in a three dimensional view. Unless otherwise specified, like reference numerals refer to like parts.

Figure 12:
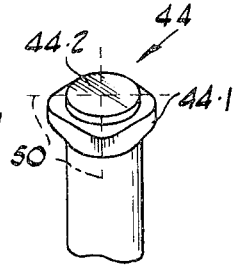
FIG. 12 shows another three dimensional view of a head for fastening elements, in blank, according to the invention.

In FIG. 12, reference numeral 44 likewise generally designates another head in blank formed from a length of wire which has had a head 44.1 formed on it in accordance with the method of the invention. In this case, the whole of the head 44.1 is substantially square in end elevation, and the platform 44.2 is substantially circular in end elevation.

Figure 13:
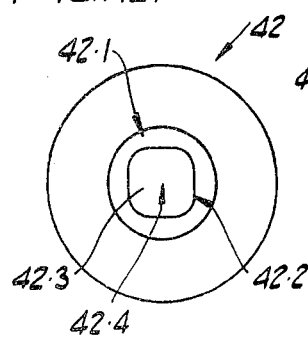
FIG. 13 shows an end elevation of the rough punch of FIG. 10.

In FIG. 13, reference numeral 42 generally designates in front elevation the rough punch of FIG. 10. Once again, unless otherwise specified, like reference numerals refer to like parts.

Figure 15:
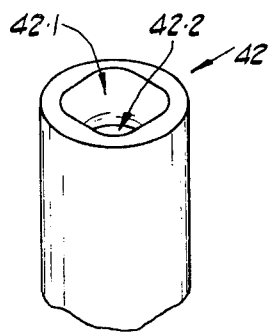
FIG. 15 shows a three dimensional view of another rough punch for use in the method according to the invention.
Figure 14:
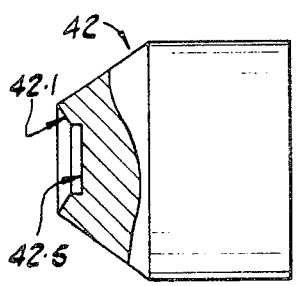
FIG. 14 shows a sectional side elevation of another rough punch for use in the method according to the invention.

In FIGS. 14 and 15 reference numerals 42 indicate further rough punches in accordance with the invention. The rough punch 42 of FIG. 14, similar to that of FIG. 10, has a curved concave die formation 42.1 which is circular in end elevation. This curved die formation has a centrally positioned substantially square recess 42.5 at its bottom. This recess 42.5 corresponds with the recess at 42.4 defined by the passage 42.4 and kick-out pin 42.3 of the rough punch 42 of FIG. 10. In FIG. 15, reference numeral 42.1 designates a concave die formation. The die formation 42.1 of FIG. 15, instead of being curved and circular in end elevation as in FIGS. 10, 13 and 14, is substantially square in end elevation. The corners of the square are somewhat rounded, and it has a flat floor, its side walls merging into the flat floor via corners which are rounded. There is a centrally positioned passage 42.2 in said floor. The passage 42.2 is circular in end elevation and has a kick-out pin (not shown) which is circular in cross-section located therein. This kick-out pin is recessed from the mouth of the passage 42.2 and is located by a spring, as shown in FIG. 10. The rough punch of FIG. 15 is suitable for making the blank head on the wire length 44 shown in FIG. 12.

Figure 16:
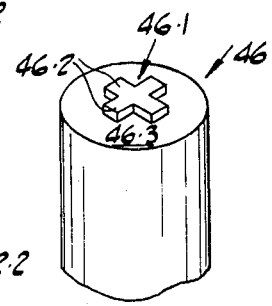
FIG. 16 shows a three dimensional view of a finisher punch for use in the method according to the invention.

In FIG. 16, reference numeral 46 generally designates a finisher punch for use in the method according to the invention. The finisher punch 46 has a cruciform die formation 46.1 having a pair of intersecting slot-forming formations 46.2. The slot forming formations are normal to each other and are of equal length. The finisher punch 46 has a circular flat end face 46.3 on which the die formation 46.1 is centrally located. The slot-forming formations 46.2 have widths and depths corresponding to the widths and maximum depths of the slots 20 of FIGS. 1 to 6.

In accordance with the method, a short length of metal wire 44 is located longitudinally in the passage 40.1 of the die 40 (FIG. 10) with its free end projecting outwardly at the mouth 40.2 by a predetermined amount. One of the rough punches 42 is then located axially in register with the passage 40.1 with its die formation 42.1 directed at the wire 44. It is moved axially inwardly in the direction of arrow 48 to engage via its die formation 42.1, the free end of the wire 44. The recessed mouth of the passage 42.2 receives and guides the free end of the wire 44 into the passage 42.2. Movement along arrow 48 continues until the spring 42.21 bottoms to become fully compressed, after which the wire 44.1 is deformed to produce the head 44.1 in blank with its platform 44.2 formed by the passage 42.2. By cold-working via the said die formation the head 44.1 is thus formed in blank. This cold-working step is such as to form a circular head 44.1 which has a square platform 44.2 as shown in FIG. 11, or a square head 44.1 which has a round platform 44.2 as shown in FIG. 12, depending on the rough punch used. (Use of the punches 42 of FIGS. 14 and 15 is similar to that of the punch 42 of FIGS. 10 and 13).

The rough punch is then removed, and the finisher punch is placed in position registering axially with the passage 44.1. The finisher punch 16 is also moved inwardly in the direction of arrow 48 to engage the head 44.1. When it engages the head 44.1, the finisher punch cold-forges a cruciform recess in the head, and as shown in FIGS. 1 to 6, the recess corresponds in slot width and maximum slot depth respectively to the width and thickness of the slot-forming formation on the finisher punch.

During the cold-forging step by means of the finisher punch, the slot forming formations 46.2 (FIG. 16) are aligned with the platform 44.2 (FIG. 11) or the head 44.1 (FIG. 12) so that they extend substantially along the diagonals 50 (broken lines in FIGS. 11 and 12) of said platform and head respectively. The size of the head and platform, and the squaring off of the platform (FIG. 11) and head (FIG. 12) are matched with the size of the die formation 46.1 of the finisher punch 46 so that metal flow which takes place during the cold-forging step of the finisher punch renders the head substantially circular in end elevation.

It will be appreciated that the method for forming the heads of FIGS. 7 to 9 is similar to that for forming the heads of FIGS. 1 to 6. For the head of FIG. 7 the rough-punching step is such as to provide an elongate rectangular platform on a circular head. Then, during the cold-forging step by means of the finisher punch, the longitudinal axis of the die formation 46.1, and hence the recess 18 (indicated by broken line 52 in FIG. 7), is aligned to extend along the longitudinal centre line of the elongate rectangular platform formed in blank.

For the head of FIGS. 8 and 9, the method is the same as for FIGS. 1 to 6, with the difference that the finisher punch 46 has a die formation corresponding in shape to the recess 18 shown in FIGS. 8 and 9.

In screw fastening elements, particularly screws or bolts, which have a shank and head at one end of the shank, the head being provided with a centrally located axially outwardly facing recess to receive the bit of the screw driver, it is desirable for the recess to comprise a flat-bottomed slot capable of receiving the bit of a chisel-ended screw driver. This feature allows commonly used chisel-ended screw drivers to be used in conjunction with the fastening element and does not necessitate a special screw driver. It is also desirable in certain applications for the head to have a flat axially outwardly directed end face, when the head is countersunk and is intended for use in position in a conical countersunk recess. The length of the slot should preferably be large in relation to the head diameter, so that torque can easily be applied to it by the screw driver. The slot conveniently has its ends closed off to aid in locating the screw driver bit, and it is desirable to have the metal of the head defining the slot as hard as possible to prevent damage thereto in use by the screw driver.

In screw fastening element heads known to the applicant and which have a single flat bottomed slot with closed off ends cold-forged therein, there is the disadvantage that the forging step leads to ovalisation of the screw head. This disadvantage is most pronounced in screw heads with diameters exceeding about half a centimeter, slot lengths exceeding about half the head diameter; and maximum slot depths and slot widths which exceed about an eighth of the maximum diameter of the head in end elevation. This disadvantage is present particularly in countersunk heads having flat axially outwardly directed end faces, even when the heads are constrained during cold-forging operation in conical or countersunk die formations. When intersecting slots are used to overcome the problem of ovalisation, the ovalisation problem is replaced by the similar problem of squaring of the heads. The squaring is less pronounced than the ovalisation, but is also a disadvantage. This disadvantage, as mentioned above for ovalisation, is most pronounced with countersunk screw heads of large diameter and slot dimensions which are large in relation to the diameter. Once again this applies particularly to countersunk screw heads having flat end faces, even when the countersunk portion of the head is constrained during the slot-forming operation. To avoid squaring, it is thus necessary to keep the slot dimensions relatively small in relation to the head diameter, leading to loss of torque during screwing or unscrewing with the screw driver.

To overcome the above disadvantages, the applicant is aware that cruciform recesses comprising intersecting slots have been forged in round or pan-type screw fastening element heads. Squaring of the heads thus take place at a position remote from the countersunk portion and from the periphery of the head, so that the countersunk portion and periphery remain circular in end elevation. This procedure nevertheless has the disadvantage that the slots have open ends, and that the slot lengths are low in relation to the head diameter, as the slots are at the rounded apex of the head. This leads, as mentioned above, to reduced torque during tightening or untightening; and there is no positive location of the screw driver bit lengthwise along the slots. A further appraoch of which the applicant is aware, is to have the recesses in the intersecting slots of lengths which are small in relation to the head diameter as used in Phillips-type screws. The cruciform recess of Phillips-type screws, to compensate for loss in torque are relatively deep, and the slots slope downwardly to a central lowermost point. PHILLIPS screws thus have the disadvantage that a special screw driver is required, and that screw drivers with chisel-ended bits cannot be used conveniently with them. Attempting to use a chisel-ended screw driver with a Phillips-type screw often leads to damage of the cruciform recess and unsatisfactory tightening or untightening owing to loss of torque and slipping.

The applicant is also aware that screw fastening elements having heads in which the recess comprises a pair of flat bottomed closed-off intersecting slots have been proposed. No method of making the slots has however specifically been proposed, and it appears that machining was contemplated. The advantage of work hardening of the metal surrounding the slots obtained by cold-forging is thus lost, and the slots are subject to damage during tightening or untightening of the screw fastening elements. Machining the slots is completely impractical from a commercial mass production point of view. Furthermore, the machining, if not carried out with great care leads to burrs and other irregularities in the slots, which render use of the screw elements difficult by snagging with the screw driver bit.

The invention overcomes the above disadvantages by providing circular screw heads with cruciform recesses having slot dimensions which are large in relation to head diameter. These slot dimensions coupled with the flat bottoms of the slots, allow ordinary chisel-ended screw drivers conveniently to be used. Positive location of the screw driver bit is obtained by the closed-off ends of the slots; and high torque can be applied due to the high relative length of the slots to head diameter. Furthermore, work-hardening of metal surrounding the recess during cold-forging of the recess leads to clean smooth slots and a reduction of damage during tightening and untightening.

We claim:

1. A method of forming a centrally located axially outwardly directed cruciform recess suitable for use with a chisel-ended screw driver and comprising a pair of intersecting slots which are substantially flat-bottomed and have their ends closed off in the axially outwardly directed end face of the head of a fastening element including a shank and a head at one end of the shank, the head being substantially circular in end elevation and the slots having substantially flat floors located in a common plane normal to the polar axis of the element, which method comprises the steps of:
    preforming the head in blank by cold-working with a rough punch having a concave die formation such as to render the head in blank at least in part substantially rectangular in end elevation; and
    cold-forging the recess by means of a finisher punch provided with a cruciform die formation comprising a pair of intersecting slot-forming formations having flat coplanar outwardly directed faces, the die formation being located centrally relative to the head during the cold-forging step, with the flat faces of the slot forming formations normal to the polar axis of the element, the slot forming formations being aligned with the head so that they extend substantially along the diagonals of the head during the cold-forging step.

2. A method as claimed in claim 1, in which the slots intersect each other at their mid-points and are of the same depth, width and length, their widths being constant and their lengths being at least half the maximum diameter in end elevation of the head, the cold-working step being such that the head in blank has a central substantially rectangular raised platform standing proud of the remainder of the head, and the cold-forging being by means of a finisher punch in which the slot forming formations are of the same width, depth and length, said width and depth being constant and the slot forming formations intersecting each other at their mid-points.

3. A method as claimed in claim 2, in which the slot length is about two thirds of the maximum head diameter and in which the slots are normal to each other, the cold-working being by means of a rough punch having a concave die formation which is substantially circular in end elevation and which has at its bottom a centrally positioned axially outwardly directed recess which is substantially square in end elevation, such that the head in blank is substantially circular in end elevation and has a central substantially square raised platform standing proud of the remainder of the head.

4. A method as claimed in claim 3, in which the cold-working is by means of a rough punch in which the axially outwardly directed recess is defined by a centrally positioned axial passage at the bottom of the concave die formation, in which passage there is located a kick-out pin having a cross-section which is substantially square, the end of the kick-out pin being spaced inwardly along the passage from the mouth of the passage into the concave die formation.

5. A method of forming a centrally located axially outwardly directed cruciform recess suitable for use with a chisel-ended screw driver and comprising a pair of intersecting slots which are substantially flat bottomed and have their ends closed-off in the axially outwardly directed end face of the head of a fastening element including a shank and a head at one end of the shank, the head being substantially circular in end elevation, the slots having flat floors located in a common plane normal to the polar axis of the element and the slots having lengths which are at least half of the maximum diameter in end elevation of the head, which method comprises the steps of:

preforming the head in blank by cold-working with a rough punch having a concave die formation which has at its bottom a centrally positioned axially outwardly directed recess which is substantially rectangular in end elevation, such that the head in blank is substantially circular in end elevation and has a central substantially rectangular raised platform standing proud of the remainder of the head;

and cold-forging the recess by means of a finisher punch provided with a cruciform die formation having a pair of intersecting slot-forming formations having flat coplanar outwardly directed faces, the die formation being located centrally relative to the platform during the cold-forging step, with the flat faces of the slot-forming formations normal to the polar axis of the element, and the slot-forming formations aligned with the head such that they extend substantially along the diagonals of the platform during the cold-forging step.

6. A method as claimed in claim 5, in which the slots are normal to each other and of the same width and length, their widths being constant and between about an eight and a quarter of the maximum head diameter, their maximum depth being between about an eighth and a quarter of the maximum head diameter, and their lengths being about two thirds of said maximum head diameter, which method includes the step of having the recess in the rough punch substantially square in end elevation and defined by a kick-out pin which in cross-section is substantially square located in a centrally positioned axial passage of substantially square cross-section provided in the bottom of the concave die formation, the end of the pin being spaced inwardly along the passage from the mouth of the passage into the recess, and which includes the step of having the slot forming formations substantially normal to each other and of substantially the same width, depth and length, said width and depth being substantially constant along the lengths of the slot forming formations.

* * * * *